June 5, 1928. Re. 16,990
G. S. WITHAM, JR
MOISTURE CONTROLLING DEVICE
Original Filed Feb. 17, 1922 3 Sheets-Sheet 1
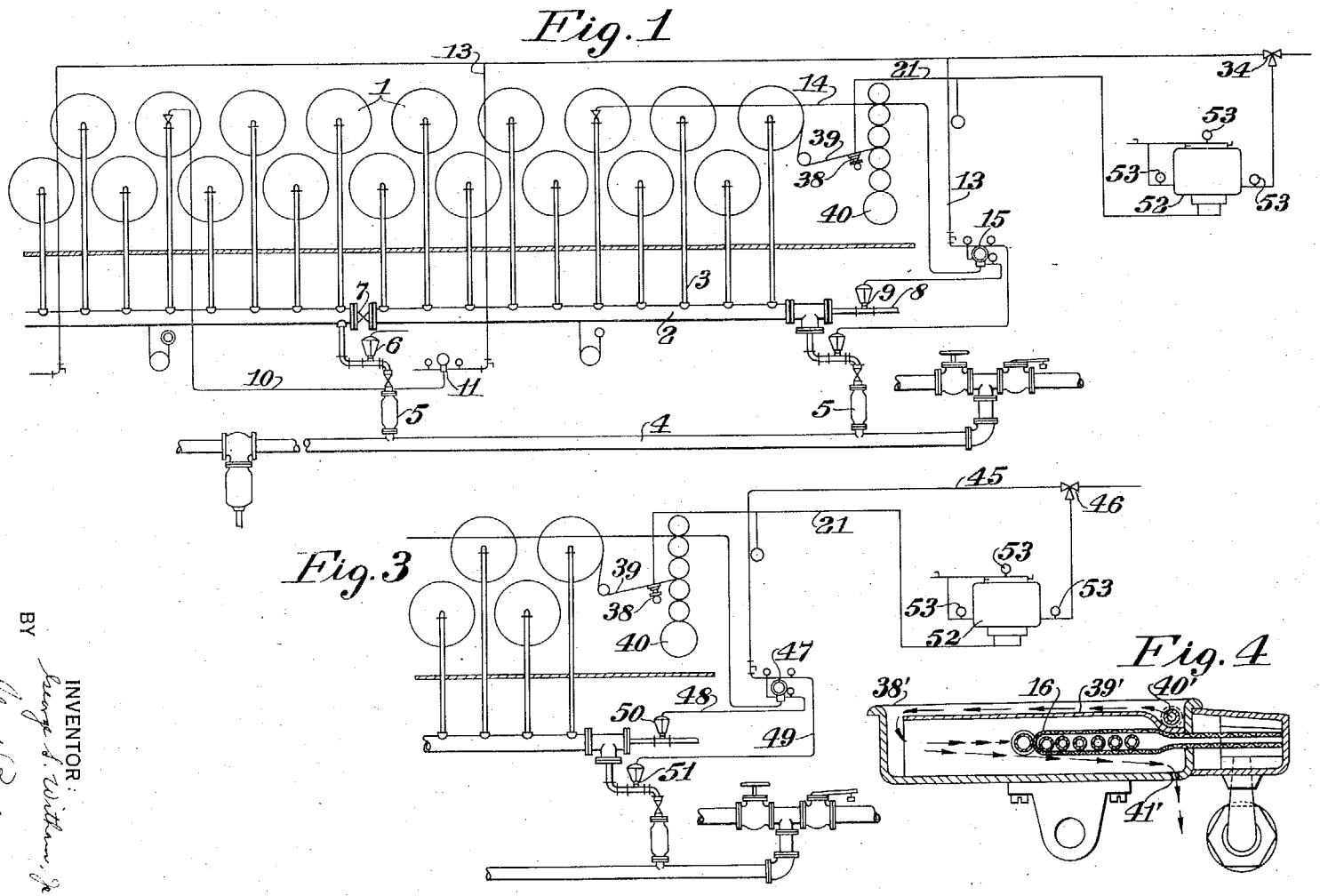
INVENTOR:
George S. Witham, Jr.
BY
Alfred D. Burger
ATTORNEY June 5, 1928. Re. 16,990
G. S. WITHAM, JR
MOISTURE CONTROLLING DEVICE
Original Filed Feb. 17, 1922 3 Sheets-Sheet 2
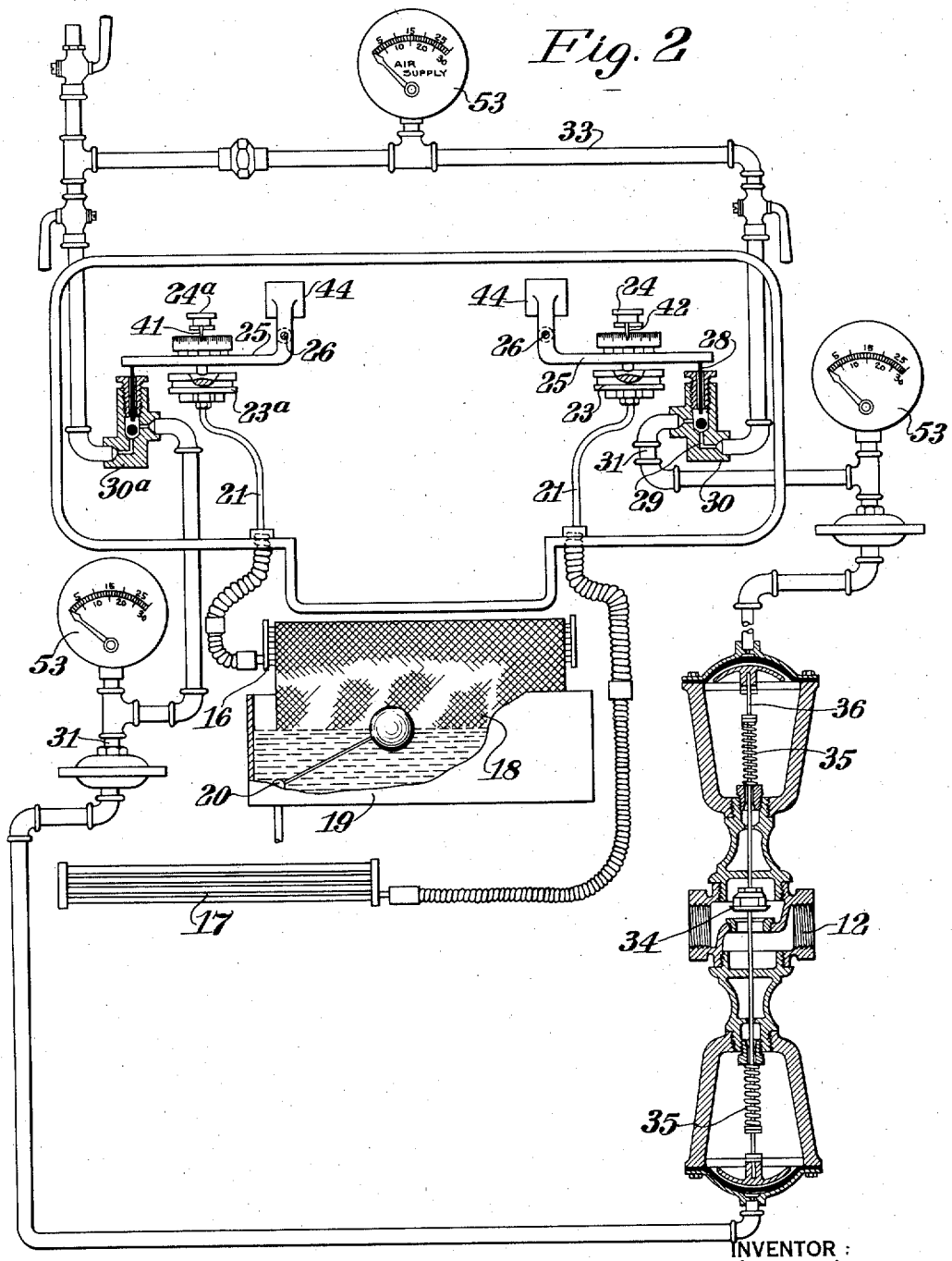
INVENTOR:
George S. Witham, Jr.
BY
Alfred D. Berger
ATTORNEY June 5, 1928. Re. 16,990

G. S. WITHAM, JR

MOISTURE CONTROLLING DEVICE

Original Filed Feb. 17, 1922 3 Sheets-Sheet 3

INVENTOR:
George S. Witham, Jr.
BY
Alfred Berger
ATTORNEY

Reissued June 5, 1928.

Re. 16,990

UNITED STATES PATENT OFFICE.

GEORGE STANFORD WITHAM, JR., OF HUDSON FALLS, NEW YORK.

MOISTURE-CONTROLLING DEVICE.

Original application filed February 17, 1922, Serial No. 537,328. Renewed April 28, 1927. Original No. 1,646,515, dated October 25, 1927. Application for reissue filed April 2, 1928. Serial No. 266,737.

My invention is an improvement in moisture controlling devices, and relates particularly to mechanism for controlling the temperature of the dryers in paper making machines, in accordance with the humidity of the paper being dried. In paper making machines the formed web is usually dried by means of heated cylinders, and the temperature required for the proper drying is arbitrarily determined, in accordance with the grade of paper being made. The regulation of the temperature is controlled by the back tender, who judges the moisture content of the web by the feel of the same, and the amount of steam admitted to the dryer, and the consequent temperature maintained therein is regulated in accordance with his judgment. The moisture content of the web of a selected grade is not a constant factor, varying in accordance with many conditions, among which may be mentioned atmospheric. Hence, a temperature that will properly dry a selected grade of paper under certain conditions, may be insufficient, or more than sufficient, under other conditions. In addition the moisture content of the formed web is not the same throughout its area, portions thereof having a higher moisture content than other portions. Obviously only a small proportion of the area of the web coming from the dryer can be tested, and the temperature of the dryer, and the final condition of the web will be determined by the condition of a portion which may be abnormally dry or abnormally wet. Hence, the final condition of the web, as regards the degree of drying is largely dependent on chance.

Since the moisture content of a web of a selected grade is not a constant factor, the control of the admission of steam to the drying rolls by the temperature of the rolls does not meet all conditions. In a copending application, Serial No. 531,863, filed January 26, 1922, I provide means for determining and recording the humidity of the web, at any selected point between the wet end of the forming mechanism and the calender rolls, and for simultaneously determining and recording the temperature at such point, thereby to permit the temperature to be regulated in accordance with the humidity, and to attain proper drying of any grade of paper regardless of varying conditions as to humidity.

In the present invention, I provide other mechanism controlled by the said means, for controlling the admission of steam to the drying rolls, and the consequent temperature of the dryer, so that such temperature is governed by the condition of the web as regards humidity, the temperature being so regulated that the web is dried to the desired degree whatever its condition.

In the drawings:

Figure 1 is a diagrammatic side view of the dryer of a paper making machine, provided with the improved controlling mechanism, Figure 2 is a diagrammatic view of the controlling mechanism, Figure 3 shows an alternative arrangement.

Figure 4 is a transverse section of one form of tester which may be used,

Figure 5:
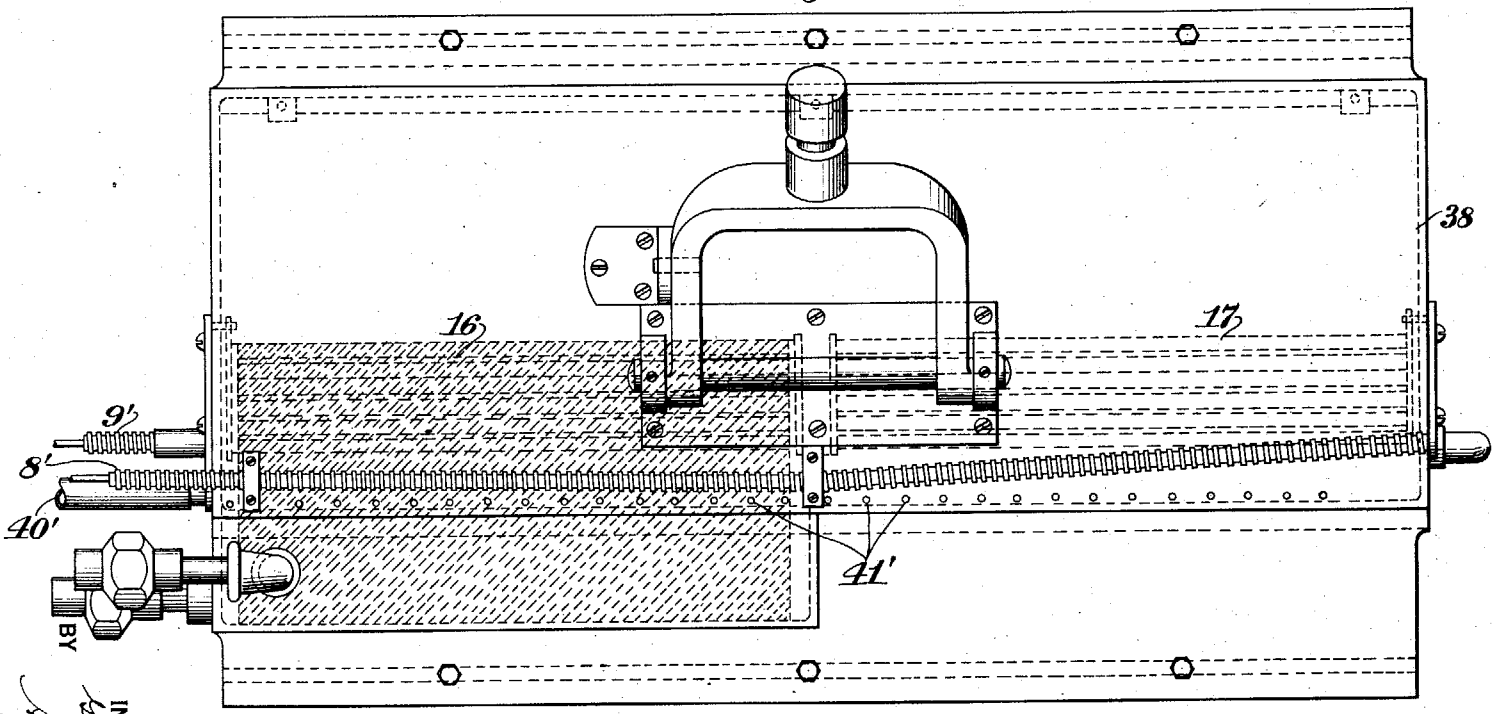
Figure 5 is an enlarged bottom view of the form of tester shown in Figure 4.

The present embodiment of the invention is shown in connection with a dryer of usual construction, including a plurality of heated cylinders 1, about which the paper web passes, and the cylinders are heated by steam in the usual manner, the steam being supplied from a manifold 2, which is connected to the respective cylinders at their axes, thereby not interfering with the rotation of the cylinders. Exhaust steam is supplied to the manifold from a pipe 4, which is connected to the manifold by inlet pipes 5. A diaphragm operated valve indicated at 6, is interposed in each of the pipes 5, and the valve is controlled by fluid under pressure, which is admitted to the diaphragm chamber above the diaphragm, to close the valve or partially close the same when the temperature rises above a selected mean. The cylinders of the dryers are arranged in series, and each series is supplied from a section of manifold, the manifold being divided into sections as shown. The sections of the manifold are connected by valves 7, which may be opened when desired, but under normal conditions, the sections are disconnected from each other, and a pipe 5 connects each section with the supply pipe 4. Within a selected cylinder of each series, a thermostatic element is arranged, which controls the valve 6 in the pipe 5 which supplies the manifold section with exhaust steam. Preferably the section of cylinders remote from the paper machine, that is that set of cylinders adjacent to the calender rolls, is arranged to control an auxiliary supply of live steam. The steam is supplied by a pipe 8, and the supply is controlled by a diaphragm valve 9 interposed in the said pipe. The thermostatic element in the last section of cylinders control not only the valve 6 in the adjacent pipe 5, but controls also the valve 9 in the auxiliary steam supply pipe. As shown in Figure 1, a pipe 10 from each thermostatic element is connected with a controlling valve 11, and this valve controls the fluid pressure supply to the adjacent valve 6.

Fluid under pressure, usually air, is supplied by a pipe line 12, which has branches 13 leading to the respective valves 11. The valves 11 are so constructed and arranged, that when the temperature in the selected cylinder increases and the fluid of the thermostat expands, the valve 11 will be moved toward open position, to admit a higher pressure to the valve 6. The valves 6 are so constructed and arranged, that the admission of a higher pressure to the diaphragm chamber will move the valve toward closed position, reducing or shutting off the supply of steam, until the temperature falls to the proper degree. The pipe 14 which leads from the thermostat in the selected cylinder of the last series is connected to the duplex valve 15, and the valve 15 is so constructed and arranged that it will control the flow of fluid under pressure to the valve 6 in the adjacent pipe 5, and to the valve 9 of the auxiliary live steam supply. The arrangement of the entire mechanism is such, that a uniform temperature is maintained in each section of the dryer. When the temperature falls below a selected degree, the supply of exhaust steam is increased, while when the temperature passes above the selected degree, the supply of exhaust steam is throttled. This construction is shown and described in my prior application, Serial No. 457.304, filed March 31, 1921, and the arrangement provides for the maintenance of a uniform temperature throughout the drying operation, the temperature being set at any desired degree. In addition the dryer may be operated in such manner that the temperature will gradually increase from the wet end to the dry end, the temperature being stepped up at each section of the dryer.

The above described arrangement provides for the proper drying of a selected grade of paper, but there is no provision for variations in the moisture content of such selected grade, nor for varying atmospheric conditions. Where the moisture content is greater, or less than the estimated content for the grade, or where atmospheric conditions are such that the evaporation is hastened, or lessened, the selected temperatures for the different sections for the selected grade of paper must be varied, if at all, solely in accordance with the back tender's opinion, determined by the feel of the paper.

In my co-pending application, Serial No. 531.863 filed January 26, 1922, I show and describe mechanism for indicating and recording the humidity and temperature, at a face of the web being dried, and so arranged that it may be used to test conditions at any point in the area of the web. The said mechanism shown diagrammatically in Figure 2, comprises a wet bulb 16 and a dry bulb 17, the wet bulb being kept constantly moistened by any suitable means, as for instance, a wick 18, dipping into a tank 19, having a float controlled supply valve 20 for retaining a constant level of liquid in the tank. The pipes 21 from the dry and wet bulbs are connected to diaphragm chambers 23 and 23ª respectively. The diaphragms of the respective chambers are engaged by pointed screws 24 and 24ª, which are threaded through elbow levers 25. The outer end of one arm of each lever 25 is pivoted at 26 to a fixed bracket 44, and the outer end of the other arm engages a valve stem 28, which cooperates with a valve 29 in casings 30 and 30ª, interposed in the supply line 33 of motor fluid for operating a valve 34 which controls the pipe line 12 before mentioned. This valve 34 is a differentially controlled valve. Diaphragm casings 32 and 32ª are arranged on opposite sides of the valve 34, and the valve has stems 36 connected therewith, extending into both diaphragm casings and slidably connected with the diaphragms in the casings, as clearly shown in Figure 2. Coil springs 35 encircle the ends of the stem, between stops on the stem and the casings 32 and 32ª, and act normally to hold the valve open.

The dry bulb 17 is influenced only by the temperature of the air in the tester 38 which carries the wet and dry bulbs, and as shown and described in my co-pending application above mentioned, a slight volume of dry compressed air is passed between the paper web and the tester, to provide a circulation over the wet bulb. In the form of tester shown in Figures 4 and 5, the wet bulb 16 consists of a series of tubes arranged side by side in a pan 38′. The dry bulbs 17 likewise consists of a series of tubes arranged as shown in Figure 5. Flexible tubes 8′ and 9′ are connected to the dry and wet bulbs respectively. The wet bulbs are covered by a plate 39′, which extends across the pan to a point near the edge thereof most remote from the bulbs. A perforated tube 40′ is arranged above the plate 39′ near one end thereof. When the apparatus is in use, the web of material being dried passes along the top of the pan 38′ and gas, for example compressed air, is supplied through the tube 40′. This gas passes along the web of material to the far edge of the pan 38′ and then passes below the plate 39′, as indicated by the arrows. After the air or other gas comes in contact with the bulbs 16 and 17 it passes out through suitable vents 41′.

The wet bulb is influenced by the amount of evaporation that takes place on its surface, and the change is a measure of the amount of moisture in the tester. The dryer the paper moving over the tester the dryer will be the air at the tester and the more rapid will be the evaporation. Hence the larger the amount of heat extracted from the wet bulb, the lower the temperature in comparison with the dry bulb. The wetter the paper, the more slowly will evaporation take place at the wet bulb and the less heat will be extracted. Hence the temperature at the wet bulb will be correspondingly high in comparison with the dry bulb. When conditions as to dryness of the paper web are normal, that is when the web is being sufficiently dried, and not overdried, the temperature of the dryer will be maintained at a selected degree suitable for the grade of paper being dried. Should, however, there be overdrying, the evaporation at the wet bulb will become more rapid, and the temperature at the wet bulb will fall. The diaphragm of the casing 23ᵃ will contract, shutting off the motive fluid to the diaphragm chamber 32ᵃ, and the differential pressure on the diaphragms in the chambers 32 and 32ᵃ will move the valve 34 towards closed position, shutting off the motive fluid to the valves 6 and 7, and cutting off the supply of steam to the dryer, thereby to reduce the temperature. If on the other hand the paper is wet, the evaporation at the wet bulb will be hindered, or lessened, and the temperature will rise, expanding the diaphragm of the casing 23ᵃ, and opening the motive fluid line to the diaphragm chamber 32ᵃ. Increase of pressure in such chamber will tend to move the valve 34 toward open position. The movement of the valve 34 will also be influenced by conditions at the dry bulb, that is by changes in temperature at the said bulb, and the action of the bulbs on the valve 34 is a joint or differential action. The testing mechanism constituted by the wet and dry bulbs and associated parts, is mounted in a support indicated at 38, which is adapted to be moved transversely of the web 39 either continuously, or intermittently, by any suitable mechanism, and preferably the said mechanism is arranged near the calendar rolls indicated at 40. By means of this mechanism the condition of the web as regards humidity and temperature may be ascertained, the test being made continuously, or at regular intervals, or in any desired manner, and at any part of the web, and the temperature of the dryer may be nicely regulated to suit conditions. If conditions as indicated by the test require more heat, either because of increased humidity, or because of lessened temperature, the valve 34 will be moved toward open position, increasing the supply of exhaust steam to the dryer, and if the emergency requires, admitting live steam to the header 2. It will be understood that so long as the exhaust steam is sufficient to provide the requisite temperature, the live steam is not turned into the header 2, the live steam being an auxiliary heating means, for use when the exhaust steam does not suffice.

In order to permit the device to be adjusted to any desired mean, so that the fluctuations due to humidity and temperature changes above and below such mean, will control the device to vary the temperature, I provide the mechanism shown in connection with the pointed screws 24 and 24ᵃ in Figure 2. The said mechanism comprises a scale 41 aranged adjacent to the screw, and a pointer or indicator 42 on the screw. By adjusting the screws 24 and 24ᵃ, which are thumb screws, any desired ratio of leverage may be secured.

In Figure 3 an alternative arrangement is shown, wherein the wet and dry bulb mechanism controls the steam supply for the last section of the dryer only. In this arrangement, the motor fluid line 45 is controlled by a diaphragm valve 46 similar to the valve 32, and this line 45 is connected only to the duplex valve 47, corresponding to the valve 15 of Figure 1. The duplex valve is connected by pipe lines 48 and 49 with diaphragm valves 50 and 51 corresponding to the valves 9 and 6 of Figure 1, and controlling the supply of live and exhaust steam, respectively. The pipes 21 of the tester 38 are connected to the air line controlling mechanism, and this mechanism controls the valve 46, which in turn controls the air line. The operation is precisely the same as in the construction of Figure 1, except that the mechanism controls only the duplex valve. Referring to Figure 2, it will be seen that suitable pressure gauges 53 are aranged in the pipes 33 and 31, respectively, and that a suitable casing 52 encloses the controlling mechanism for the motor fluid line. In both constructions, the valves 15 and 47 are duplex valves, controlling both the exhaust and live steam lines while the valves 11 control only the exhaust steam supply. It will be understood that any preferred form of hygrostat may be used to determine the humidity.

I claim:

1. The method of drying paper on heated cylinders or the like, which consists in supplying a heating medium to the cylinders and controlling the supply thereof by means responsive to changes in the humidity in close proximity to the face of the paper.

2. The method of drying paper on heated cylinders or the like, which consists in supplying a heating medium to the cylinders, and controlling the supply thereof by means responsive to changes in both the humidity at the face of the paper and the temperature of the cylinders.

3. The method of drying paper on heated cylinders or the like, which consists in supplying a heating medium to all of the cylinders from a common source, controlling the supply thereof to certain of the cylinders by means responsive to the temperature of one of them and to the humidity at the face of the paper, and independently controlling the supply of heating medium to other cylinders by means responsive to the temperature of one of these other cylinders and to the humidity at the face of the paper.

4. In dryers for paper and the like, means responsive to the humidity in close proximity to the face of the web, for regulating the temperature of the dryer.

5. In dryers for paper and the like, means controlled by both the humidity and temperature at the face of the paper for regulating the temperature of the dryer.

6. In dryers for paper and the like, means for heating the dryer, and means controlled by variations in humidity and temperature at the face of the web for increasing the heat with high humidity and low temperature and for decreasing the heat with low humidity and high temperature.

7. In dryers for paper and the like, means for supplying heating fluid to the dryer, and means controlled by the temperature and humidity at the face of the web for controlling the supply to increase the same with high humidity and low temperature and to decrease the supply with low humidity and high temperature.

8. In a dryer for paper and the like, means for supplying heating gas to the dryer, a valve for controlling the supply, and means responsive to the humidity and temperature at the face of the web for regulating said valve.

9. In dryers for paper and the like, means for supplying a heating gas to the dryer, an auxiliary supply for heating gas, and means responsive to both the temperature and the humidity in close proximity to the face of the web for regulating the heating gas supplies.

10. In dryers for paper and the like, the combination with the heating cylinders, means for supplying steam to the cylinders, means controlled by the temperature of selected cylinders for regulating the supplying means to maintain a selected temperature in the cylinders, and means for varying said supply in accordance with the temperature and humidity at the face of the web.

11. In dryers for paper and the like, the combination with the drying cylinders. means for supplying exhaust steam to the cylinders, an auxiliary live steam supply for the cylinders, means controlled by the temperature of selected cylinders for regulating the steam supply to maintain a selected temperature in the cylinders, and means for varying the supply in accordance with variations in humidity and temperature at the face of the web.

12. In dryers for paper and the like, the combination with the heating cylinders, and means for supplying a heating gas thereto, of a valve for regulating the supply, fluid under pressure operated means controlling the valve, and means controlled by the temperature and humidity at a face of the web for controlling said fluid pressure operated means.

13. In dryers for paper and the like, the combination with the heating cylinders, the means for supplying heating gas thereto, a diaphragm valve for controlling the supply, fluid pressure controlled means for operating the valve, and means controlled by the humidity and temperature at the face of the web for operating the fluid pressure controlling means.

14. The method of drying material on heated cylinders and the like, which comprises supplying a heating medium to the cylinders, directing a current of gas into contact with the surface of the material, whereby said gas partakes of the moisture condition of the material, measuring the moisture content of said gas after contact with said material, and controlling the supply of said heating medium in accordance with the moisture content of said gas.

15. In dryers for paper and the like, means for supplying heating fluid to the dryer, a conductor for gas having an opening arranged adjacent and adapted to be substantially closed by a portion of the surface of said material for subjecting a current of gas passing through said conductor to intimate contact with said material, means for conducting gas to said conductor for passage therethrough, humidity responsive means subjected to said current of gas after contact of the same with said material, and mechanism actuated by said humidity responsive means for controlling the supply of said heating fluid to the dryer.

16. The combination with a machine for making a web of paper or the like comprising drying cylinders and means for heating the same, of a moisture-responsive device, means for maintaining a flow of gas past and in intimate contact with a surface portion of substantially constant area of said web, to the moisture-responsive means and means controlled by the moisture-responsive means for regulating said heating means in accordance with the moisture condition of the gas.

In testimony whereof I affix my signature.

GEORGE STANFORD WITHAM, JR.